United States Patent
Li et al.

(10) Patent No.: US 10,756,363 B2
(45) Date of Patent: Aug. 25, 2020

(54) HYDROGEN CIRCULATION SYSTEM FOR FUEL CELL

(71) Applicant: Industrial Technology Research Institute, Hsinchu (TW)

(72) Inventors: Chun-han Li, Tainan (TW); Reiko Ohara, Tainan (TW); Jar-Lu Huang, Kaohsiung (TW); Ya-Yi Hsu, Tainan (TW); Ming-Tao Hu, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 212 days.

(21) Appl. No.: 15/849,623

(22) Filed: Dec. 20, 2017

(65) Prior Publication Data

US 2019/0148746 A1  May 16, 2019

(30) Foreign Application Priority Data

Nov. 10, 2017 (TW) .............................. 106138879 A

(51) Int. Cl.
*H01M 8/00* (2016.01)
*H01M 8/04089* (2016.01)

(52) U.S. Cl.
CPC ... *H01M 8/04097* (2013.01); *H01M 8/04104* (2013.01)

(58) Field of Classification Search
CPC ................ H01M 8/04097; H01M 8/04104
See application file for complete search history.

(56) References Cited

U.S. PATENT DOCUMENTS

| 5,441,821 A | 8/1995 | Merritt et al. |
| 8,722,265 B2 | 5/2014 | Umayahara et al. |

(Continued)

FOREIGN PATENT DOCUMENTS

| CN | 101887981 | 11/2010 |
| CN | 105609827 | 5/2016 |

(Continued)

OTHER PUBLICATIONS

Amey Y. Karnik, et al., "Control Analysis of an Ejector Based Fuel Cell Anode Recirculation System," American Control Conference, Jun. 2006, pp. 484-489.

(Continued)

*Primary Examiner* — Nicholas P D'Aniello
(74) *Attorney, Agent, or Firm* — JCIPRNET

(57) ABSTRACT

A hydrogen circulation system for fuel cell includes a hydrogen supply pipeline, a return pipeline, a buffer tank, an ejector, a differential pressure valve, a solenoid valve, and a controller. The return pipeline connects a hydrogen outlet of a fuel cell stack and the hydrogen supply pipeline. The buffer tank is installed at the return pipeline. The ejector is installed at the hydrogen supply pipeline for connecting the buffer tank. The differential pressure valve is between a hydrogen source and the ejector for adjusting a pressure in the hydrogen supply pipeline based on a pressure difference between an anode inlet and a cathode inlet of the fuel cell stack. The solenoid valve is installed at the return pipeline between the buffer tank and the hydrogen outlet. According to an output voltage or a load of the fuel cell stack, a switch of the solenoid valve is controlled by the controller.

7 Claims, 3 Drawing Sheets

(56) References Cited

U.S. PATENT DOCUMENTS

| | | | | |
|---|---|---|---|---|
| 2008/0166611 | A1* | 7/2008 | Yoshida | H01M 8/04097 429/446 |
| 2008/0187793 | A1* | 8/2008 | Owejan | H01M 8/0228 429/414 |
| 2009/0155641 | A1* | 6/2009 | Senner | H01M 8/04097 429/411 |
| 2010/0015482 | A1* | 1/2010 | Kajiwara | H01M 8/04097 429/515 |

FOREIGN PATENT DOCUMENTS

| | | |
|---|---|---|
| JP | 2007242476 | 9/2007 |
| JP | 2009252634 | 10/2009 |
| JP | 4379749 | 12/2009 |
| JP | 4779301 | 9/2011 |
| JP | 4781500 | 9/2011 |
| TW | I305433 | 1/2009 |

OTHER PUBLICATIONS

Mohsen Dadvar, et al., "Analysis of design parameters in anodic recirculation system based on ejector technology for PEM fuel cells: A new approach in designing," International Journal of Hydrogen Energy, vol. 39, Issue 23, Aug. 2014, pp. 12061-12073.

Paul Rodatz, et al., "Efficiency Improvements by Pulsed Hydrogen Supply in PEM Fuel Cell Systems," IFAC Proceedings Volumes, vol. 35, Issue 1, 2002, pp. 259-264.

Jenn-Jiang Hwang, "Passive hydrogen recovery schemes using a vacuum ejector in a proton exchange membrane, fuel cell system," Journal of Power Sources, vol. 247, Feb. 2014, pp. 256-263.

B. Belvedere, et al., "Experimental analysis of a PEM fuel cell performance at variable load with anodic exhaust management optimization," International Journal of Hydrogen Energy, vol. 38, Issue 1, Jan. 2013, pp. 385-393.

"Notice of allowance of Taiwan Counterpart Application", dated Apr. 11, 2018, p. 1-p. 3.

* cited by examiner

HYDROGEN CIRCULATION SYSTEM FOR FUEL CELL

CROSS-REFERENCE TO RELATED APPLICATION

This application claims the priority benefits of Taiwan application serial no. 106138879, filed on Nov. 10, 2017. The disclosure of which is hereby incorporated by reference herein in its entirety.

TECHNICAL FIELD

The disclosure relates to a hydrogen circulation system for a fuel cell.

BACKGROUND

A hydrogen supply system of a fuel cell system comes in a number of different modes, and among them, a DE (dead-end) mode is the mode that achieves the greatest power generation efficiency. However, in the DE mode, hydrogen needs to be provided at a stoichiometric ratio of more than 1, and purge needs to be performed periodically to discharge impurities (e.g. water) in the fuel cell to prevent a decline in power generation performance of the fuel cell stack.

However, when the purge is performed, in addition to discharging the impurities, the unused hydrogen is also discharged at the same time. Therefore, as the demand for high-power fuel cells increases in the future, if hydrogen is still supplied in the DE mode, hydrogen consumption will be significantly increased, and fuel efficiency will be reduced.

Accordingly, to enhance the efficiency of the fuel cell and reduce hydrogen consumption, hydrogen discharged by the fuel cell stack is recycled and mixed with hydrogen from a hydrogen source. Currently, hydrogen recycle is performed by using, for example, a hydrogen circulation pump. However, such equipment is not only expensive but also additionally consumes power of the fuel cell.

SUMMARY

One of exemplary embodiments of the disclosure provides a hydrogen circulation system for a fuel cell. The hydrogen circulation system includes a hydrogen supply pipeline, a return pipeline, a buffer tank, an ejector, a differential pressure valve, a solenoid valve, and a controller. The hydrogen supply pipeline connects a hydrogen source and a fuel cell stack and is configured to supply hydrogen of the hydrogen source to an anode inlet of the fuel cell stack. The return pipeline connects a hydrogen outlet of the fuel cell stack and the hydrogen supply pipeline and is configured to return exhaust gas of the hydrogen outlet to the hydrogen supply pipeline. The buffer tank is installed at the return pipeline and is configured to accumulate returned hydrogen. The ejector is installed at the hydrogen supply pipeline and connects to the buffer tank and is configured to transmit the returned hydrogen in the buffer tank to the hydrogen supply pipeline. The differential pressure valve is installed at the hydrogen supply pipeline between the hydrogen source and the ejector and is configured to adjust a pressure in the hydrogen supply pipeline based on a pressure difference between the anode inlet and a cathode inlet of the fuel cell stack. The solenoid valve is installed at the return pipeline between the buffer tank and the hydrogen outlet.

The controller is configured to control a switch of the solenoid valve according to an output voltage or a load of the fuel cell stack.

Accordingly, through the design of installing the ejector, the solenoid valve, the buffer tank, and the differential pressure valve in the hydrogen circulation system, the embodiments of the disclosure solve the issue of accumulated impurities such as water and ensure that the pressure difference between the two electrodes of the fuel cell stack does not damage a membrane electrode assembly (MEA). Moreover, components in the hydrogen circulation system of the embodiments of the disclosure are basically all mechanical components, which thus saves power of the fuel cell and contributes to reducing costs of the fuel cell.

Several exemplary embodiments accompanied with figures are described in detail below to further describe the disclosure in details.

DESCRIPTION OF THE EMBODIMENTS

Figure 1:
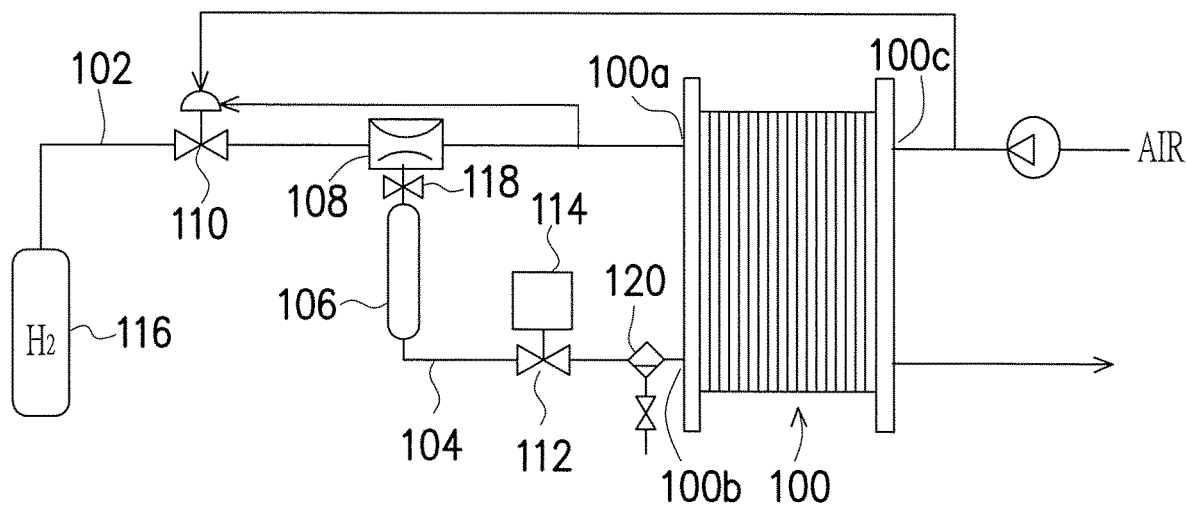
FIG. 1 is a schematic diagram illustrating a fuel cell equipment including a hydrogen circulation system for a fuel cell according to an embodiment of the disclosure.

Referring to the embodiments below and the accompanied drawings for a sufficient understanding of the disclosure. However, the disclosure may still be implemented in many other different forms and should not be construed as limited to the embodiments described hereinafter. In the drawings, for clarity, the components and their relative dimensions may not be illustrated based on their actual sizes.

FIG. 1 is a schematic diagram illustrating a fuel cell equipment including a hydrogen circulation system for a fuel cell according to an embodiment of the disclosure.

Referring to FIG. 1, the fuel cell equipment basically includes a fuel cell stack 100, and the hydrogen circulation system for a fuel cell according to a first embodiment is a system configured to supply hydrogen to and recycle hydrogen from the fuel cell stack 100. The hydrogen circulation system includes a hydrogen supply pipeline 102, a return pipeline 104, a buffer tank 106, an ejector 108, a differential pressure valve 110, a solenoid valve 112, and a controller 114. The hydrogen supply pipeline 102 connects a hydrogen source 116 and the fuel cell stack 100 and is configured to supply hydrogen of the hydrogen source 116 to an anode inlet 100*a* of the fuel cell stack 100. The return pipeline 104 connects a hydrogen outlet 100*b* of the fuel cell stack 100 and the hydrogen supply pipeline 102 and is configured to return exhaust gas of the hydrogen outlet 100b to the hydrogen supply pipeline 102.

In FIG. 1, the buffer tank 106 is installed at the return pipeline 104 and is configured to accumulate the returned hydrogen. The ejector 108 is installed at the hydrogen supply pipeline 102 and connects the buffer tank 106. Specifically, the ejector 108 draws in the returned hydrogen in the buffer tank 106 and transmits the returned hydrogen to the hydrogen supply pipeline 102 by using a high-speed ejection flow and a low-pressure suction force generated when high-pressure hydrogen from the hydrogen source 116 enters the ejector 108 through the hydrogen supply pipeline 102. The returned hydrogen is mixed with the hydrogen in the hydrogen supply pipeline 102, and then they are provided for the fuel cell stack 100. Meanwhile, as air in the buffer tank 106 is discharged, a vacuum (negative pressure) is created inside the buffer tank 106. The ejector 108 is, for example, a Venturi vacuum pump. From a leak prevention perspective, the hydrogen circulation system of the present embodiment further includes, for example, a check valve 118 installed between the buffer tank 106 and the ejector 108 and configured to prevent the high-pressure hydrogen of the hydrogen source 116 from entering the buffer tank 106.

The differential pressure valve 110 is installed at the hydrogen supply pipeline 102 between the hydrogen source 116 and the ejector 108 and is configured to adjust a pressure in the hydrogen supply pipeline 102 based on a pressure difference between the anode inlet 100a and a cathode inlet 100c of the fuel cell stack 100. In an embodiment, when the pressure difference between the anode inlet 100a and the cathode inlet 100c exceeds a predetermined pressure, the differential pressure valve 110 shuts the hydrogen supply pipeline 102. Moreover, after the pressure at the anode inlet 100a drops, the differential pressure valve 110 may re-open the hydrogen supply pipeline 102. For example, in a case where a pressure tolerance of MEA films (not illustrated) in the fuel cell stack 100 is set at 0.1 kg, when the pressure at the anode inlet 100a is gradually increased such that the pressure difference ΔP between the anode inlet 100a and the cathode inlet 100c is greater than 0.1 kg, the differential pressure valve 110 shuts the hydrogen supply pipeline 102 and stops hydrogen supply to cause the pressure at the anode inlet 100a to drop rapidly.

In addition, the pressure of the returned hydrogen drops after the returned hydrogen passes through the buffer tank 106, and the pressure at the anode inlet 100a of the fuel cell stack 100 is decreased accordingly, which thus contributes to reducing the pressure difference between the two electrodes (i.e., the anode inlet 100a and the cathode inlet 100c) of the fuel cell stack 100. Namely, even if the differential pressure valve 110 is absent, it is still possible to ensure the protective effect on the MEA films (not illustrated) in the fuel cell stack 100.

The solenoid valve 112 is installed at the return pipeline 104 between the buffer tank 106 and the hydrogen outlet 100b. The controller 114 is configured to control a switch of the solenoid valve 112 according to an output voltage or a load of the fuel cell stack 100. Moreover, to purge impurities (e.g., water), the hydrogen circulation system generally further includes a water segregator 120 installed at the return pipeline 104 between the solenoid valve 112 and the hydrogen outlet 100b and configured to remove the water contained in the exhaust gas of the hydrogen outlet 100b.

In an embodiment, the controller 114 opens the solenoid valve 112 when the output voltage of the fuel cell stack 100 is lower than a predetermined working voltage, such that a pressure difference or a pressure pulse is generated in the return pipeline 104 due to the negative pressure resulting from the vacuum in the buffer tank 106, and the returned hydrogen is drawn from the hydrogen outlet 100b and enters the buffer tank 106. The pressure pulse creates turbulence effect in the return pipeline 104 and hydrogen paths in the fuel cell stack 100, which contributes to purging the impurities such as water through the water segregator 120 and raising the voltage of the fuel cell stack 100.

In another embodiment, when the load of the fuel cell stack 100 is lower than a predetermined load (e.g., in low load operation), since the low pressure generated inside the ejector 108 is not sufficient for returning hydrogen, the controller 114 in the first embodiment may open the solenoid valve 112 when the load of the fuel cell stack 100 is lower than the predetermined load, such that a pressure difference or a pressure pulse is generated in the return pipeline 104, and turbulence effect is created in the return pipeline 104 and the hydrogen paths in the fuel cell stack 100, which contributes to purging impurities such as water through the water segregator 120 and drawing the returned hydrogen into the buffer tank 106.

Moreover, the controller 114 may cause the solenoid valve 112 to perform repeated open/shut operations within a predetermined time period without checking the output voltage or the load of the fuel cell stack 100 in advance.

In the text below, experimental examples are provided to verify the effect of the disclosure, but the disclosure is not limited to the description below.

Experimental Example

Fuel cell equipment as shown in FIG. 1 was manufactured, wherein a 6.8 L buffer tank was used, and a ¼ inch pipe (i.e., an inside diameter of the pipe is ¼ inch) was used as the pipeline between the solenoid valve and the buffer tank. Moreover, the differential pressure valve was designed and manufactured in a form of a four-way adjustment valve, and it could receive the pressure at the anode inlet and the pressure at the cathode inlet of the fuel cell stack and then adjust the hydrogen supply pipeline based on the pressure difference.

Figure 2:
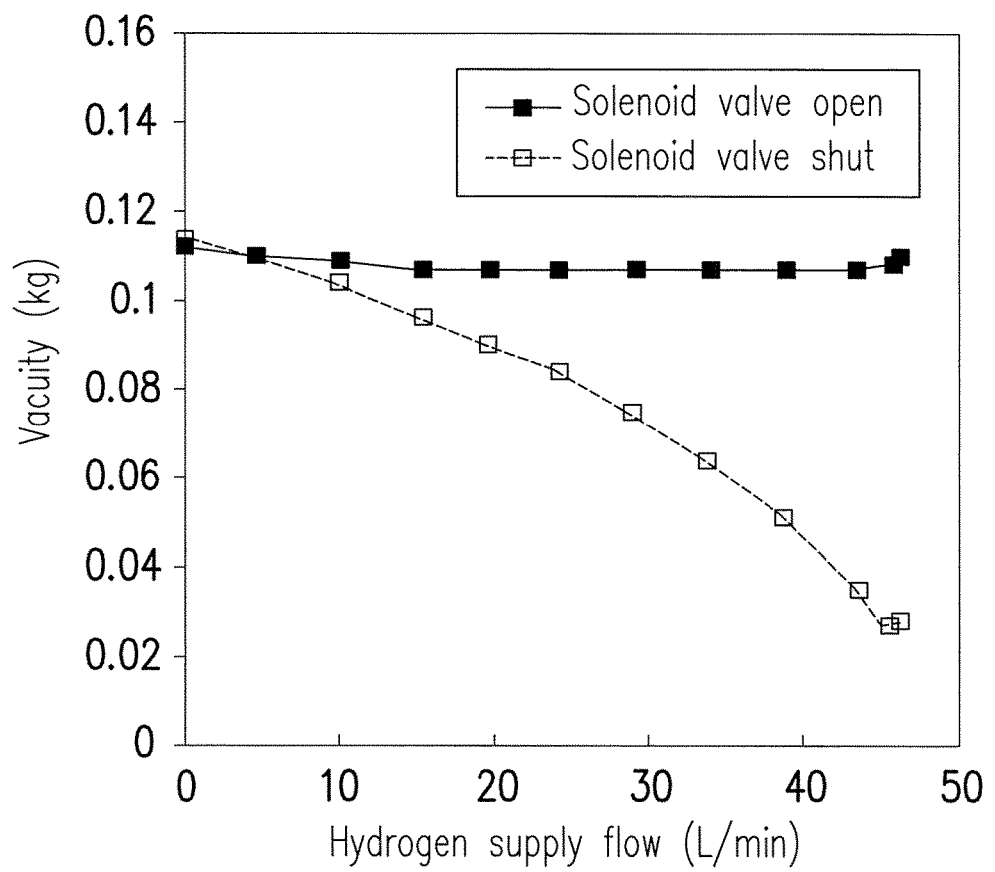
FIG. 2 illustrates curve graphs of test results of pressure variations of a hydrogen supply pipeline at the time when a solenoid valve of a system of Experimental Example is open and shut.

Then, variations in a hydrogen supply flow and a vacuity of the ejector were measured in cases where the solenoid valve is open and shut in the system of Experimental Example, and the results were shown in FIG. 2. According to FIG. 2, the vacuum pressure of the ejector did not vary much when the solenoid valve was open. However, when the solenoid valve was shut, the vacuum pressure of the ejector was decreased. Accordingly, an internal purging mechanism is established by generating a pressure pulse using the pressure difference in the vacuity of the ejector generated when the solenoid valve is opened and shut, which solves the issue of impurities easily accumulated when the fuel cell stack is operated in a low load mode.

Figure 3:
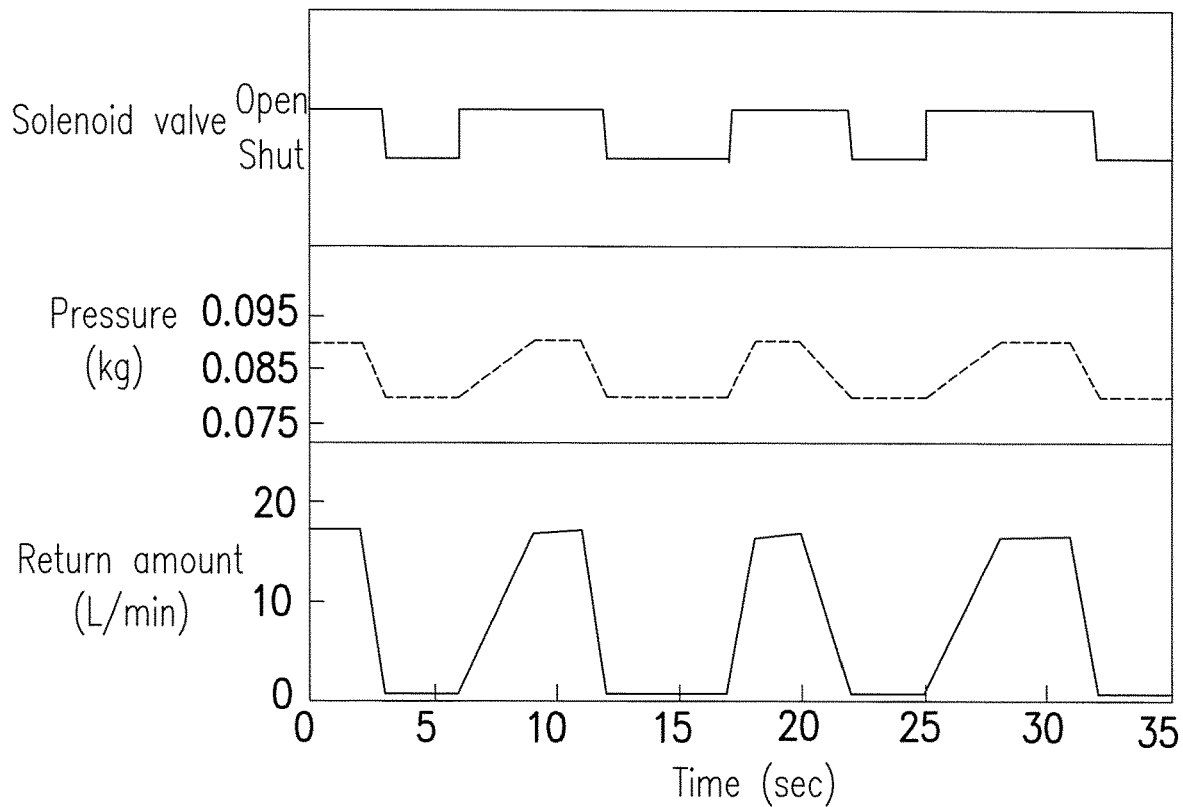
FIG. 3 illustrates curve graphs of a pressure and a return flow of a return pipeline at the time when the solenoid valve of the system of Experimental Example is open and shut.

Next, variations in a pressure and a return amount of the return pipeline were further measured in cases where the solenoid valve is open and shut in the system of Experimental Example, and the results were shown in FIG. 3. According to FIG. 3, with the solenoid valve being shut, the low-pressure suction force in the ejector caused the air pressure in the return pipeline to be significantly decreased. Conversely, with the solenoid valve being open, the air in the return pipeline began to return, and the pressure rose to the working pressure.

Figure 4:
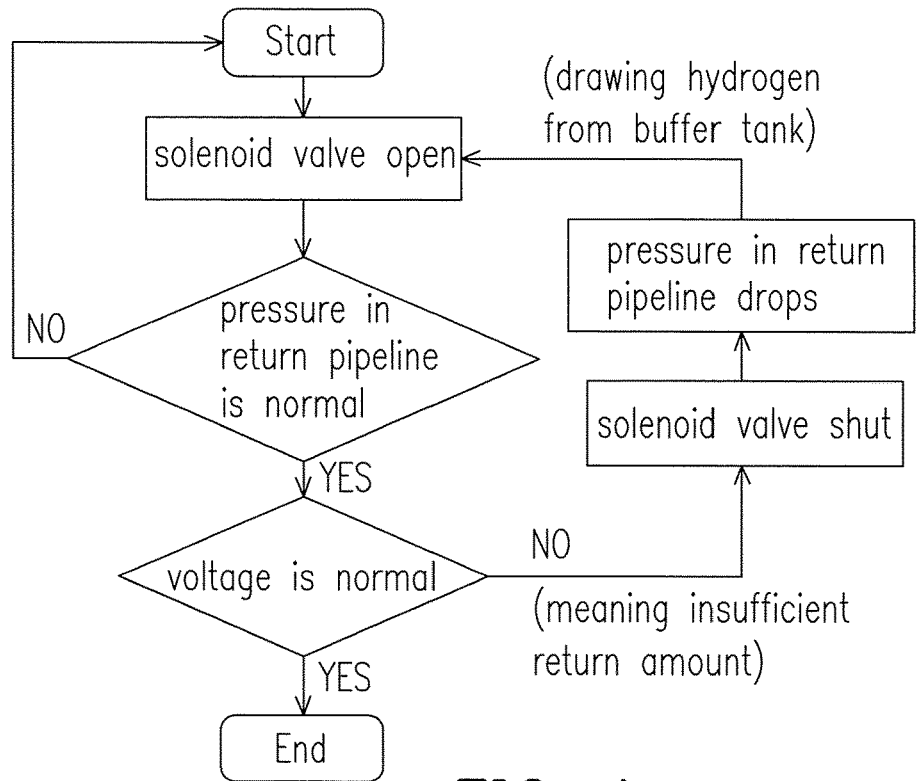
FIG. 4 is a flowchart illustrating operation steps of the system of Experimental Example.

Moreover, according to a flowchart illustrated in FIG. 4, the system of Experimental Example was actually operated, and current/voltage variations of the fuel cell stack were measured. The result is presented in FIG. 5.

In addition, the system of Experimental Example was actually operated, and variations in the pressure difference between an anode outlet and a cathode outlet occurring as the hydrogen supply flow was changed were measured. The result is presented in FIG. 6.

Comparative Example 1

A fuel cell equipment of a DE mode was manufactured, and it differs from Experimental Example in that the ejector, the solenoid valve, the buffer tank, and the differential pressure valve were absent. Then, the fuel cell equipment in the DE mode was actually operated, and current/voltage variations of its fuel cell stack were measured. The result is presented in FIG. 5.

Figure 5:
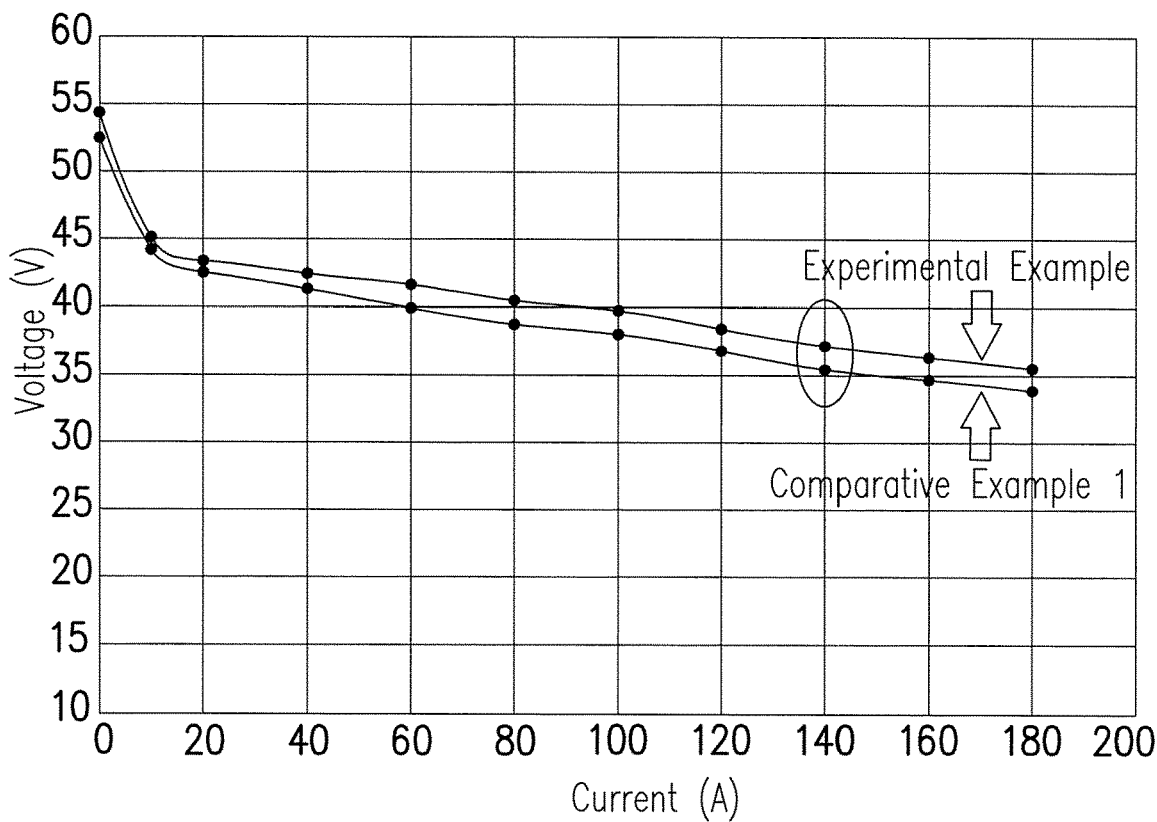
FIG. 5 illustrates curve graphs of a power generation efficiency of fuel cell stacks of Experimental Example and Comparative Example 1.

According to FIG. 5, when the current is 140 A, power generation efficiency rose from 4,970 W in Comparative Example 1 to 5,280 W of Experimental Example. Therefore, the power generation efficiency of the system of Experimental Example was improved by 5%.

Comparative Example 2

Fuel cell equipment similar to Experimental Example was manufactured, but a buffer tank was not included. Then, the system of Comparative Example 2 was actually operated, and variations in the pressure difference between the anode outlet and the cathode outlet as the hydrogen supply flow was changed were measured. The result is presented in FIG. 6.

Figure 6:
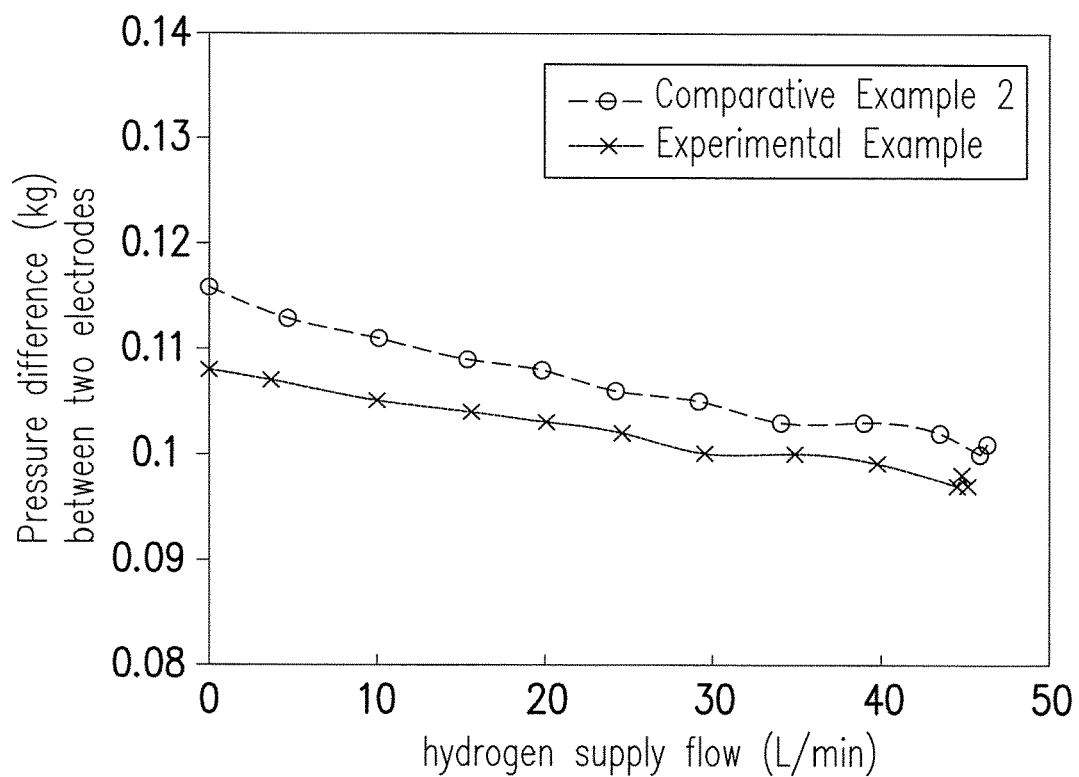
FIG. 6 illustrates curve graphs of a pressure difference between two electrodes of systems of Experimental Example and Comparative Example 2 as a hydrogen supply flow varies.

According to FIG. 6, the pressure of the returned gas dropped after the returned gas passed through the buffer tank in the system of Experimental Example, and the pressure at the anode inlet of the fuel cell stack was decreased accordingly, which contributed to reducing the pressure difference between the two electrodes of the fuel cell stack. In contrast, the pressure difference between the two electrodes of Comparative Example 2, where the buffer tank is not present, was obviously higher.

In summary of the above, in the hydrogen circulation design of the embodiments of the disclosure, the ejector works with the solenoid valve and the buffer tank to solve the issue of accumulated impurities such as water, and the differential pressure valve is integrated to control the pressure difference and protect the fuel cell stack. In detail, at the solenoid valve installed at the return pipeline, the pressure pulse is generated by using variations (pressure difference) in the low-pressure suction force generated by the ejector when the solenoid valve is opened and shut, and the pressure pulse creates turbulence effect in the hydrogen circulation system to promote purging of the impurities (e.g., water). Moreover, the buffer tank lowers the pressure at the anode inlet and reduces the pressure difference between the two electrodes of the fuel cell stack. In addition, in the embodiments of the disclosure, the differential pressure valve is installed at the hydrogen supply pipeline to adjust the pressure in the hydrogen supply pipeline based on the pressure difference between the anode inlet and the cathode inlet to achieve the effect of protecting the membrane electrode assembly (MEA).

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A hydrogen circulation system for a fuel cell, suitable for a fuel cell stack, the hydrogen circulation system comprising:
    a hydrogen supply pipeline, connecting a hydrogen source and the fuel cell stack and configured to supply hydrogen of the hydrogen source to an anode inlet of the fuel cell stack;
    a return pipeline, connecting a hydrogen outlet of the fuel cell stack and the hydrogen supply pipeline and configured to return exhaust gas of the hydrogen outlet to the hydrogen supply pipeline;
    a buffer tank, installed at the return pipeline and configured to accumulate returned hydrogen; an ejector, installed at the hydrogen supply pipeline and connecting to the buffer tank, and configured to transmit the returned hydrogen in the buffer tank to the hydrogen supply pipeline, the ejector comprising a Venturi vacuum pump;
    a differential pressure valve, installed at the hydrogen supply pipeline between the hydrogen source and the ejector and configured to adjust a pressure in the hydrogen supply pipeline based on a pressure difference between the anode inlet and a cathode inlet of the fuel cell stack;
    a water segregator, installed at the return pipeline between the buffer tank and the hydrogen outlet and configured to remove water contained in the exhaust gas of the hydrogen outlet;
    a solenoid valve, installed at the return pipeline between the buffer tank and the water segregator; and
    a controller, configured to control a switch of the solenoid valve according to an output voltage or a load of the fuel cell stack and to control the return pipeline during an opening of the switch of the solenoid valve to generate a pressure pulse which creates a turbulence effect in the return pipeline and in hydrogen paths in the fuel cell stack, which contributes to purging of water through the water segregator.

2. The hydrogen circulation system according to claim 1, wherein the controller is configured to open the solenoid valve when the output voltage of the fuel cell stack is lower than a predetermined working voltage so as to generate a pressure difference or the pressure pulse in the return pipeline and cause the returned hydrogen to enter the buffer tank.

3. The hydrogen circulation system according to claim 1, wherein the controller is configured to open the solenoid valve when the load of the fuel cell stack is lower than a predetermined load so as to generate a pressure difference or the pressure pulse in the return pipeline and cause the returned hydrogen to enter the buffer tank.

4. The hydrogen circulation system according to claim 1, wherein the controller is further configured to cause the solenoid valve to perform repeated open/shut operations within a predetermined time period.

5. The hydrogen circulation system according to claim 1, wherein the differential pressure valve is further configured to shut the hydrogen supply pipeline when the pressure difference between the anode inlet and the cathode inlet exceeds a predetermined pressure.

6. The hydrogen circulation system according to claim 5, wherein the differential pressure valve is further configured to re-open the hydrogen supply pipeline after a pressure at the anode inlet drops.

7. The hydrogen circulation system according to claim 1, further comprising a check valve, installed between the buffer tank and the ejector and configured to prevent hydrogen of the hydrogen source from entering the buffer tank.

* * * * *